United States Patent
Zhang

(10) Patent No.: US 12,130,082 B2
(45) Date of Patent: Oct. 29, 2024

(54) HEAT PUMP DRYING SYSTEM

(71) Applicant: Yong Zhang, Guangzhou (CN)

(72) Inventor: Yong Zhang, Guangzhou (CN)

(*) Notice: Subject to any disclaimer, the term of this patent is extended or adjusted under 35 U.S.C. 154(b) by 337 days.

(21) Appl. No.: 17/152,646

(22) Filed: Jan. 19, 2021

(65) Prior Publication Data

US 2022/0082327 A1   Mar. 17, 2022

(30) Foreign Application Priority Data

Sep. 15, 2020  (CN) .......................... 202010969665.9

(51) Int. Cl.
*F26B 21/08* (2006.01)
*F26B 23/10* (2006.01)

(52) U.S. Cl.
CPC ............ *F26B 21/086* (2013.01); *F26B 23/10* (2013.01)

(58) Field of Classification Search
CPC ...... F26B 23/10; F26B 23/007; F26B 23/008; F26B 21/086; F26B 21/002; F25B 30/02
USPC .......................................... 34/209, 210, 212
See application file for complete search history.

(56) References Cited

U.S. PATENT DOCUMENTS

| | | | |
|---|---|---|---|
| 6,161,312 A * | 12/2000 | Yang | F26B 21/086 34/77 |
| 2011/0271548 A1* | 11/2011 | Park | F26B 21/08 34/526 |
| 2020/0108344 A1* | 4/2020 | Vollmer | B01D 5/0051 |

* cited by examiner

*Primary Examiner* — Tavia Sullens
(74) *Attorney, Agent, or Firm* — Tsz Lung Yeung

(57) ABSTRACT

A heat pump drying system includes a first drying compartment, a second drying compartment, a compressor having a compressor, a first heat exchanger, a second heat exchanger, a third heat exchanger, a first air conduit, a second air conduit, a first fan and a second fan. The first fan is arranged to draw air to flow in the first air conduit from the first drying compartment to sequentially pass through the third heat exchanger and the first heat exchanger and back to the first drying compartment. The second fan is arranged to draw air to flow in the second air conduit from the second drying compartment to sequentially pass through the second heat exchanger and the third heat exchanger and back to the second drying compartment. Refrigerant is arranged to sequentially flow through the compressor, the first heat exchanger, the second heat exchanger and back to the compressor.

3 Claims, 10 Drawing Sheets

HEAT PUMP DRYING SYSTEM

CROSS REFERENCE TO RELATED APPLICATION

This is a non-provisional application which claims priority to a Chinese patent application having an application number of CN 202010969665.9, and a filing date of Sep. 15, 2020, the entire contents of which is hereby incorporated by reference.

BACKGROUND

Field of Invention

The present invention relates to a drying system, and more particularly to a heat pump drying system which is capable of providing heat exchange between refrigerant and air in a very energy efficient manner.

Description of Related Arts

Conventional drying technologies utilize coal, gas or other fossil fuel as energy source for generating heat to dry objects. These conventional drying technologies are usually energy inefficient and may have adverse effect to environment. Thus, heat pump drying assemblies have been developed to generate heat in a more energy efficient manner. Conventional heat pump drying assemblies utilize several heat exchangers for performing heat exchange between refrigerant and air. However, conventional heat pump drying assemblies still suffer from low heat exchange efficiency. Thus, there is a need to develop a heat pump drying system which has enhanced heat exchange efficiency.

SUMMARY OF THE PRESENT INVENTION

Certain variations of present invention provide a heat pump drying system which is capable of providing heat exchange between refrigerant and air in a very energy efficient manner.

Certain variations of present invention provide a heat pump drying system which utilize specific refrigerant and air flowing paths to efficiently accomplish drying performance in two drying compartments.

In one aspect of embodiments of the present disclosure, it provides a heat pump drying system, comprising:
- a plurality of connecting pipes for allowing heat exchange medium to pass therethrough;
- a first drying housing defining a first drying compartment;
- a second drying housing defining a second drying compartment, the first drying compartment and the second drying compartment being arranged adjacent to each other;
- a compressor having a compressor inlet and a compressor outlet;
- a first heat exchanger connected to the compressor outlet of the compressor through at least one of the connecting pipes;
- a second heat exchanger connected to the compressor inlet of the compressor through at least one of the connecting pipes;
- a first air conduit communicating with the first drying compartment, and partially passing through the third heat exchanger and the first heat exchanger; and
- a second air conduit communicating with the second drying compartment, and partially passing through the second heat exchanger and the third heat exchanger;
- a third heat exchanger connected to the first air conduit and the second air conduit for allowing air flowing through the air conduit and the second air conduit to perform heat exchange;
- a first fan supported in communication with the first air conduit so as to draw air to flow in the first air conduit from the first drying compartment to sequentially pass through the third heat exchanger and the first heat exchanger and back to the first drying compartment;
- a second fan supported in communication with the second air conduit so as to draw air to flow in the second air conduit from the second drying compartment to sequentially pass through the second heat exchanger and the third heat exchanger and back to the second drying compartment; and
- a flow regulator connected between said first heat exchanger and said second heat exchanger for regulating a flow of refrigerant between said first heat exchanger and said second heat exchanger;
- a predetermined refrigerant being arranged to leave the compressor through the compressor outlet and pass through the first heat exchanger for releasing heat to the air passing therethrough, the refrigerant leaving the first heat exchanger being arranged to pass through the second heat exchanger for absorbing heat from the air passing therethrough, the refrigerant leaving the second heat exchanger being arranged to flow back to the compressor through the compressor inlet,
- a predetermined amount of air being arranged to flow through the first air conduit and sequentially pass through the third heat exchanger for releasing heat to the air flowing through the second air conduit in the third heat exchanger, the air in the first air conduit and flowing through the third heat exchanger being arranged to flow through the first heat exchanger for absorbing heat from the refrigerant flowing therethrough, the air in the first air conduit and flowing through the first heat exchanger being arranged to flow back to the first drying compartment; and
- a predetermined amount of air being arranged to flow through the second air conduit and sequentially pass through the second heat exchanger for releasing heat to the refrigerant passing therethrough, the air in the second air conduit and passing through the second heat exchanger being arranged to flow through the third heat exchanger for absorbing heat from the air flowing through the first air conduit in the third heat exchanger, the air in the second air conduit and flowing through the third heat exchanger being arranged to flow back to the second drying compartment.

In another aspect of the present invention, it provides a heat pump drying system, comprising:
- a plurality of connecting pipes;
- a first drying housing having a first drying compartment;
- a second drying housing having a second drying compartment;
- a third drying housing having a third drying compartment, the third drying compartment being positioned between the first drying compartment and the second drying compartment;
- a compressor having a compressor outlet and a compressor inlet;

a first heat exchanger connected to the compressor outlet of the compressor through at least one of the connecting pipes;

a second heat exchanger connected to the compressor inlet of the compressor through at least one of the connecting pipes;

a third heat exchanger connected to the third air conduit and the second air conduit for allowing air flowing through the third air conduit and the second air conduit in the third heat exchanger to perform heat exchange;

a fourth heat exchanger connected to the first air conduit and the third air conduit;

a first air conduit communicating with the first drying compartment, and partially passing through the fourth heat exchanger and the first heat exchanger;

a second air conduit communicating with the second drying compartment, and partially passing through the second heat exchanger and the third heat exchanger;

a third air conduit communicating with the third drying compartment, and partially pass through the third heat exchanger and the fourth heat exchanger;

a first fan supported in communication with the first air conduit so as to draw air to flow in the first air conduit from the first drying compartment to sequentially pass through the fourth heat exchanger and the first heat exchanger and back to the first drying compartment;

a second fan supported in communication with the second air conduit so as to draw air to flow in the second air conduit from the second drying compartment to sequentially pass through the second heat exchanger and the third heat exchanger and back to the second drying compartment;

a third fan supported in communication with the third air conduit so as to draw air to flow in the third air conduit from the third drying compartment to sequentially pass through the third heat exchanger and the fourth heat exchanger and back to the third drying compartment; and a flow regulator connected between said first heat exchanger and said second heat exchanger for regulating a flow of refrigerant between said first heat exchanger and said second heat exchanger;

a predetermined amount of refrigerant being arranged to leave the compressor through the compressor outlet and pass through the first heat exchanger for releasing heat to the air passing therethrough, the refrigerant leaving the first heat exchanger being arranged to pass through the second heat exchanger for absorbing heat from the air passing therethrough, the refrigerant leaving the second heat exchanger being arranged to flow back to the compressor through the compressor inlet;

a predetermined amount of air being arranged to flow from the first drying compartment and enter the first air conduit and sequentially pass through the fourth heat exchanger for releasing heat to the air flowing through the third air conduit in the fourth heat exchanger, the air in the first air conduit and flowing through the fourth heat exchanger being arranged to flow through the first heat exchanger for absorbing heat from the refrigerant flowing therethrough, the air in the first air conduit and flowing through the first heat exchanger being arranged to flow back to the first drying compartment;

a predetermined amount of air being arranged to flow from the second drying compartment and enter the second air conduit and sequentially pass through the second heat exchanger for releasing heat to the refrigerant passing therethrough, the air in the second air conduit and passing through the second heat exchanger being arranged to flow through the third heat exchanger for absorbing heat from the air flowing through the third air conduit in the third heat exchanger, the air in the second air conduit and flowing through the third heat exchanger being arranged to flow back to the second drying compartment, and a predetermined amount of air being arranged to flow from the third drying compartment and enter the third air conduit and sequentially pass through the third heat exchanger for releasing heat to the air passing in the second air conduit, the air in the third air conduit and passing through the third heat exchanger being arranged to flow through the fourth heat exchanger for absorbing heat from the air flowing through the first air conduit in the fourth heat exchanger, the air in the third air conduit and flowing through the fourth heat exchanger being arranged to flow back to the third drying compartment.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the present disclosure. The description is not to be taken in any limiting sense. It is presented for the purpose of illustrating the general principles of embodiments of the present disclosure.

It should be appreciated that the terms "install", "connect", "couple", and "mount" in the following description refer to the connecting relationship in the accompanying drawings for easy understanding of embodiments of the present disclosure. For example, the connection can refer to permanent connection or detachable connection or connection through connecting pipes. Furthermore, "connected" may also mean direct connection or indirect connection, or connection through other auxiliary components, such as at least one connecting pipe 100 or at least one air conduit. Therefore, the above terms should not be an actual connection limitation of the elements of embodiments of the present disclosure.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of embodiments of the present disclosure.

Figure 1:
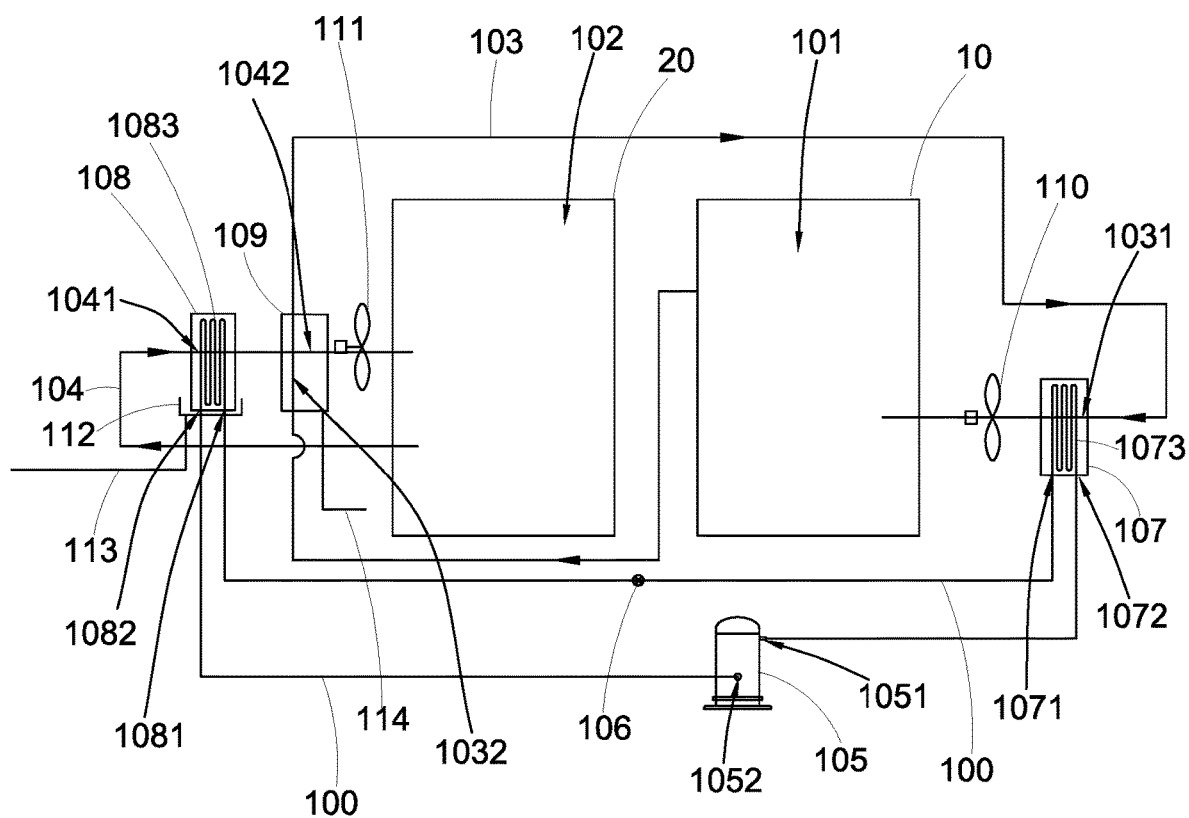
FIG. 1 is a schematic diagram of a heat pump drying system according to a first preferred embodiment of the present invention.

Referring to FIG. 1 of the drawings, a heat pump drying system according to a first preferred embodiment of the present disclosure is illustrated. Broadly, the heat pump drying system may comprise a plurality of connecting pipes 100 for allowing heat exchange medium to pass therethrough, a first drying housing 10 having a first drying compartment 101, a second drying housing 20 having a second drying compartment 102, a compressor 105 having a compressor outlet 1051 and a compressor inlet 1052, a first heat exchanger 107, a second heat exchanger 108, a third heat exchanger 109, a first air conduit 103, a second air conduit 104, a first fan 110 and a second fan 111.

The first drying compartment 101 and the second drying compartment 102 may be positioned and arranged adjacent to each other. One exemplary configuration is a side-by-side configuration as shown in FIG. 1 of the drawings.

The first heat exchanger 107 may be connected to the compressor outlet 1051 of the compressor 105 through at least one of the connecting pipes 100. The second heat exchanger 108 may be connected to the compressor inlet 1052 of the compressor 105 through at least one of the connecting pipes 100.

The first air conduit 103 may communicate with the first drying compartment 101, and partially pass through the third heat exchanger 109 and the first heat exchanger 107.

The second air conduit 104 may communicate with the second drying compartment 102, and partially pass through the second heat exchanger 108 and the third heat exchanger 109.

The third heat exchanger 109 may be connected to the first air conduit 103 and the second air conduit 104 for allowing air flowing through the first air conduit 103 and the second air conduit 104 to perform heat exchange. The third heat exchanger 109 may be positioned between the second drying compartment 102 and the second heat exchanger 108.

The first fan 110 may be supported in communication with the first air conduit 103 so as to draw air to flow in the first air conduit 103 from the first drying compartment 101 to sequentially pass through the third heat exchanger 109 and the first heat exchanger 107 and back to the first drying compartment 101.

The second fan 111 may be supported in communication with the second air conduit 104 so as to draw air to flow in the second air conduit 104 from the second drying compartment 102 to sequentially pass through the second heat exchanger 108 and the third heat exchanger 109 and back to the second drying compartment 102.

At the same time, a predetermined amount of refrigerant may be arranged to leave the compressor 105 through the compressor outlet 1051 and pass through the first heat exchanger 107 for releasing heat to the air passing therethrough the first air conduit 103 in the first heat exchanger 107. The refrigerant leaving the first heat exchanger 107 may be arranged to pass through the second heat exchanger 108 for absorbing heat from the air passing through the second air conduit 104 in the second heat exchanger 108. The refrigerant leaving the second heat exchanger 108 may be arranged to flow back to the compressor 105 through the compressor inlet 1052.

Moreover, a predetermined amount of air may be arranged to flow through the first air conduit 103 and sequentially pass through the second heat exchanger 108 for releasing heat to the air flowing through the second air conduit 104 in the third heat exchanger 109. The air in the first air conduit 103 and flowing through the third heat exchanger 109 may be arranged to flow through the first heat exchanger 107 for absorbing heat from the refrigerant flowing therethrough. The air in the first air conduit 103 and flowing through the first heat exchanger 107 may be arranged to flow back to the first drying compartment 101.

A predetermined amount of air may be arranged to flow through the second air conduit 104 and sequentially pass through the second heat exchanger 108 for releasing heat to the refrigerant passing therethrough. The air in the second air conduit 104 and passing through the second heat exchanger 108 may be arranged to flow through the third heat exchanger 109 for absorbing heat from the air flowing through the first air conduit 103 in the third heat exchanger 109. The air in the second air conduit 104 and flowing through the third heat exchanger 109 may be arranged to flow back to the second drying compartment 102.

According to the first preferred embodiment of the present invention, the heat pump drying system is for drying a wide variety of objects, such as agricultural proconduits, herbal proconduits, or even soils. These objects may be disposed in the first drying compartment 101 and the second drying compartment 102. A predetermined amount of refrigerant may flow through the connecting pipes 100 for performing heat exchange with another medium, such as air. In the first preferred embodiment of the present invention, a temperature of the first drying compartment 101 may be arranged to be greater than that of the second drying compartment 102.

The first heat exchanger 107 may have a first communicating port 1071 and a second communicating port 1072 and a plurality of first heat exchanging pipes 1073 extended between the first communicating port 1071 and the second communicating port 1072. Refrigerant may enter and exit the first heat exchanger 107 through the first communicating port 1071 and the second communicating port 1072 for performing heat exchange with another heat exchange medium. As shown in FIG. 1 of the drawings, the first communicating port 1071 may be connected to the compressor outlet 1051 of the compressor 105 through at least one connecting pipe 100.

Similarly, the second heat exchanger 108 may have a first passage port 1081 and a second passage port 1082 and a plurality of second heat exchanging pipes 1083 extended between the first passage port 1081 and the second passage port 1082. Refrigerant may enter and exit the second heat exchanger 108 through the first passage port 1081 and the second passage port 1082 for performing heat exchange with another heat exchange medium.

The heat pump drying system may further comprise a flow regulator 106 connected between the first heat exchanger 107 and the second heat exchanger 108 for regulating a flow of refrigerant between the first heat exchanger 107 and the second heat exchanger 108. Specifically, the flow regulator 106 may be connected between the second communicating port 1072 of the first heat exchanger 107 and the first passage port 1081 of the second heat exchanger 108 through at least one connecting pipe 100 so that refrigerant may flow from the second communicating port 1072 to the first passage port 1081 through the flow regulator 106.

Moreover, the second passage port 1082 of the second heat exchanger 108 may be connected to the compressor inlet 1052 of the compressor 105 through at least one of the connecting pipes 100.

The third heat exchanger 109 may accommodate a section of the first air conduit 103 and a section of the second air conduit 104 so as to allow heat exchange between the first air conduit 103 and the second air conduit 104. Specifically, the first air conduit 103 may have a second heat exchanging portion 1032 while the second air conduit 104 may have a second heat transfer portion 1042, wherein the second heat exchanging portion 1032 and the second heat transfer portion 1042 may extend in the third heat exchanger 109 for allowing air passing through the second heat exchanging portion 1032 and the second heat transfer portion 1042 to perform heat exchange with each other.

As shown in FIG. 1 of the drawings, the first air conduit 103 may extend from the first drying compartment 101, and pass through the third heat exchanger 109, the first heat exchanger 107 and eventually go back to the first drying compartment 101. The first air conduit 103 may allow air to flow therethrough. The first fan 110 may be provided to draw air to flow through the first air conduit 103 in the direction mentioned above. Thus, the first air conduit 103 may have a first heat exchanging portion 1031 extending through the first heat exchanger 107.

On the other hand, the second air conduit 104 may extend from the second drying compartment 102, and pass through the second heat exchanger 108, and the third heat exchanger 109, and eventually go back to the second drying compartment 102. The second air conduit 104 may allow air to flow therethrough. The second fan 111 may be provided to draw air to flow through the second air conduit 104 in the direction mentioned above. Thus, the second air conduit 104 may have a first heat transfer portion 1041 extending through the second heat exchanger 108.

It is worth clarifying the nature of the first air conduit 103 and the second air conduit 104. Each of the first air conduit 103 and the second air conduit 104 may be formed by an air duct extending through the corresponding path as mentioned above. Moreover, the first heat exchanging portion 1031 and the second heat exchanging portion 1032 may be formed by channels formed in the first heat exchanger 107 and the third heat exchanger 109 respectively. Similarly, the first heat transfer portion 1041 and the second heat transfer portion 1042 may be formed by channels formed in the second heat exchanger 108 and the third heat exchanger 109 respectively.

The heat pump drying system may further comprise a water discharge arrangement 30 comprising a water collection tray 112 provided underneath the second heat exchanger 108 for collecting residual or condensate water dripping from the second heat exchanger 108, and a water discharge tube 113 extended from the water collection tray 112 to an external water discharge place. The external water discharge place may be the ambient environment in which the heat pump drying system is located. The purpose of the water discharge arrangement 30 may be to guide residual or condensate water to be discharge from the heat pump drying system.

A predetermined amount of refrigerant may circulate between the compressor 105, the first heat exchanger 107, and the second heat exchanger 108. Specifically, vaporous or heated refrigerant may leave the compressor 105 through the compressor outlet 1051. The refrigerant leaving the compressor outlet 1051 may be arranged to enter the first heat exchanger 107 through the first communicating port 1071 for releasing heat to the air passing through the first heat exchanging portion 1031 of the first air conduit 103. The air passing through the first heat exchanging portion 1031 of the first air conduit 103 may absorb heat from the refrigerant and may be guided to enter the first drying compartment 101 for drying the items disposed therein.

Furthermore, the refrigerant leaving the first heat exchanger 107 may be arranged to enter the second heat exchanger 108 through the first passage port 1081 for absorbing heat from the air passing therethrough. The refrigerant may then leave the second heat exchanger 108 through the second passage port 1082 and may then be arranged to flow back to the compressor 105 through the compressor inlet 1052.

At the same time, air may be drawn from the second drying compartment 102 to pass through the second heat exchanger 108 for releasing heat (e.g. Q amount of heat) to the refrigerant passing through the second heat exchanger 108. In other words, the air passing through the second heat exchanger 108 may be cooled by the second heat exchanger 108. During this cooling process, a predetermined amount of condensate or residual water may be formed on an exterior surface of the second heat exchanger 108. This condensate or residual water may then be collected in the water collection tray 112 and may be discharged through the water discharge tube 113.

On the other hand, the air passing through the second heat exchanger 108 may then be arranged to pass through the third heat exchanger 109 along the second air conduit 104 and may perform heat exchange with the air flowing along the first air conduit 103 in the third heat exchanger 109. The air flowing through the second air conduit 104 may absorb heat (e.g. Q amount of heat) from the air flowing through the first air conduit 103 in the third heat exchanger 109. Conversely, the air flowing through the first air conduit 103 may be cooled down in the third heat exchanger 109. The air in the second air conduit 104 may then be arranged to flow back to the second drying compartment 102 for drying objects disposed therein.

The air flowing in the first air conduit 103 may continue to flow into the first heat exchanger 107 and absorb heat from the refrigerant passing therethrough. The air may then be heated and flow back to the first drying compartment 101 for drying the objects disposed therein.

It is worth mentioning that the entire refrigerant cycle as described above may allow the air flowing in the first air conduit 103 and the second air conduit 104 to be cooled down. Suppose the total heat released by the air flowing through the first air conduit 103 and the second air conduit 104 is 2Q. The loss of energy during the entire process is between the heat exchange taken place in the third heat exchanger 109 between the air flowing through the first air conduit 103 and the air flowing through the second air conconduit 104. Compared to conventional heat pump drying system, the present invention has improved coefficient of performance (C.O.P) of more than 50%.

This enhanced efficiency may be estimated as follows: for a conventional heat pump drying system, the heat pump drying system may provide an overall amount of heat Q, while work done by the heat pump drying system may be designated as P. As a result, an overall efficiency may roughly be estimated as Q/P. In the present invention, however, the overall heat utilized is 2Q. The heat exchange between the air flowing in the first air conduit 103 and the second air conduit 104 may be accomplished by the work done through the first fan 110 and the second fan 111. The overall work done by the first fan 110 and the second fan 111 may be designated as P1, and the overall efficiency may be estimated as 2Q/(P+P1). In practice, P is much greater than P1. An estimation may be that P is ten times more than P1. As a result, the overall efficiency of the present invention may be estimated as 1.5Q/P. That means the present invention has improved coefficient of performance (C.O.P) of equal to or more than 50%.

As shown in FIG. 1 of the drawings, the heat pump drying system of the present invention may further comprise a water guiding tube 114 connected to the third heat exchanger 109 for guiding residual or condensate water formed on the third heat exchanger 109 to flow out of the heat pump drying system. The residual or condensate water may be formed by heat exchange between the air flowing in the first air conduit 103 and the second air conduit 104. The heat exchange may actually take place by the heat exchange between the second heat exchanging portion 1032 and the second heat transfer portion 1042. The water guiding tube 114 may be utilized to guide the condensate or residual water generated in the third heat exchanger 109 to flow out of the heat pump drying system.

Figure 2:
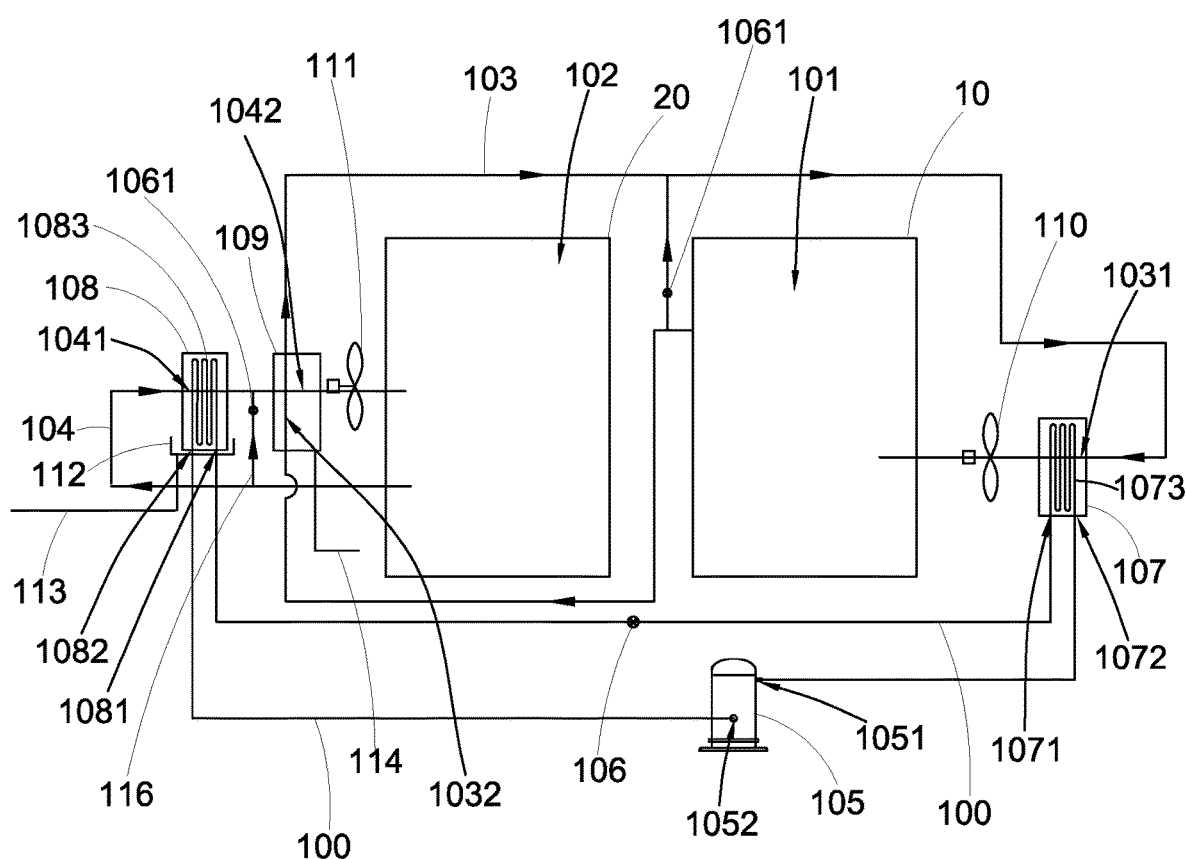
FIG. 2 is a schematic diagram of the heat pump drying system according to a first alternative mode of the first preferred embodiment of the present invention.

Referring to FIG. 2 of the drawings, a first alternative mode of the heat pump drying system according to the first preferred embodiment of the present invention is illustrated. The first alternative mode is identical to what was described in the first preferred embodiment above, except the heat pump drying system may further comprise a third air conduit 115 and a fourth air conduit 116. The third air conduit 115 may extend from and act as a branch of the first air conduit 103 at a position before the first air conduit 103 enters the third heat exchanger 109, and to a position after the first air conduit 103 has passed through the third heat exchanger 109 but before entering the first heat exchanger 107. Each of the third air conduit 115 and the fourth air conduit 116 may be formed by an air duct extending through the corresponding path as mentioned above.

On the other hand, the fourth air conduit 116 may extend from and act as a branch of the second air conduit 104 at a position before the second air conduit 104 pass through the second heat exchanger 108, to a position after the second air conduit 104 has passed through the second heat exchanger 108 but before entering the third heat exchanger 109.

It is worth mentioning that the purpose of the third air conduit 115 may be to flexibly adjust the flow rate of the air going into the first heat exchanger 107 so as to maximize heat exchange efficiency of the first heat exchanger 107. Another purpose of the third air conduit 115 may be to minimize the temperature of the air flowing through the first heat exchanger 107. Air from the flowing from out of the first drying compartment 101 may be bifurcated into two streams, one flowing toward the third heat exchanger 109 along the first air conduit 103, the other flowing toward the first heat exchanger 107 along the third air conduit 115 and eventually merge with the first air conduit 103 at a position after the first air conduit 103 has passed through the third heat exchanger 109. In other words, the air passing through the third heat exchanger 109 through the first air conduit 103 may be arranged to merge with the air just flowing out of the first drying compartment 101 through the third air conduit 115.

On the other hand, the purpose of the fourth air conduit 116 may be to flexibly adjust the flow rate of the air going into the third heat exchanger 109 so as to maximize a heat exchange efficiency thereof and to better control the temperature of the air in the second air conduit 104 after passing through the third heat exchanger 109.

Furthermore, the heat pump drying system may further comprise a plurality of flow regulators 1061 connected to the third air conduit 115 and the fourth air conduit 116 so as to selectively control a flow rate of the air passing through the third air conduit 115 and the fourth air conduit 116 respectively.

Figure 3:
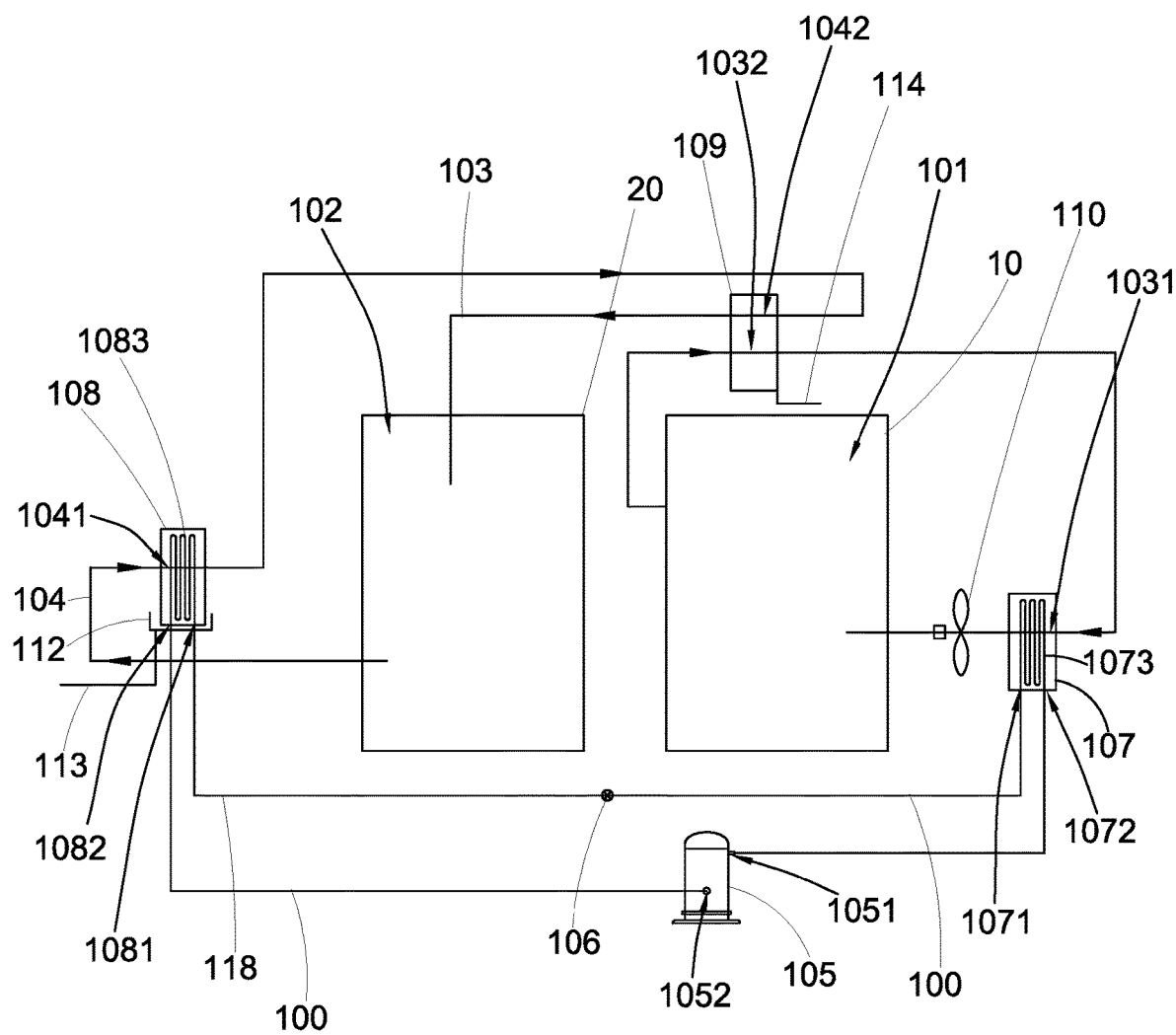
FIG. 3 is a schematic diagram of the heat pump drying system according to a second alternative mode of the first preferred embodiment of the present invention.

Referring to FIG. 3 of the drawings, a second alternative mode of the heat pump drying system according to the first preferred embodiment of the present invention is illustrated. The second alternative mode is identical to what was what was described in the first preferred embodiment above, except the third heat exchanger 109 may be positioned in a vicinity of the first drying compartment 101.

According to the second alternative mode, the third heat exchanger 109 may no longer be placed between the second heat exchanger 108 and the second fan 111. Rather, the third heat exchanger 109 may be positioned in a vicinity of the first drying compartment 101 such that the first air conduit 103 may sequentially pass through the third heat exchanger 109 and the first heat exchanger 107 from the first drying compartment 101, while the second air conduit 104 may sequentially pass through the second heat exchanger 108 and the third heat exchanger 109 from the second drying compartment 102. The second fan 111 may be omitted in this second alternative mode.

Moreover, the third heat exchanger 109 may be equipped with a predetermined amount of refrigerant so that the heat exchange between the first air conduit 103 and the second air conduit 104 may be accomplished through the refrigerant. Specifically, the refrigerant may absorb heat from the first air conduit 103 (from the second heat exchanging portion 1032) and release the heat to the second air conduit 104 (to the second heat transfer portion 1042) so that the heat from the air flowing in the first air conduit 103 may be transferred to the air flowing in the second air conduit 104 in the third heat exchanger 109.

In this second alternative mode of the first preferred embodiment of the present invention, the second heat transfer portion 1042 of the second air conduit 104 may be positioned above the second heat exchanging portion 1032 of the first air conduit 103 so that the refrigerant having absorbed the heat from the second heat exchanging portion 1032 may become vaporous state which may naturally go up the third heat exchanger 109 and release heat to the second heat transfer portion 1042 of the second air conduit 104.

After releasing heat, the refrigerant may be condensed back to liquid state and naturally drop back down to the second heat exchanging portion 1032 for absorbing heat again. No additional energy is needed to drive the movement of the refrigerant in the third heat exchanger 109.

The water guiding tube 114 may be connected to the third heat exchanger 109 for guiding residual or condensate water formed on the third heat exchanger 109 to flow out of the heat pump drying system.

Figure 4:
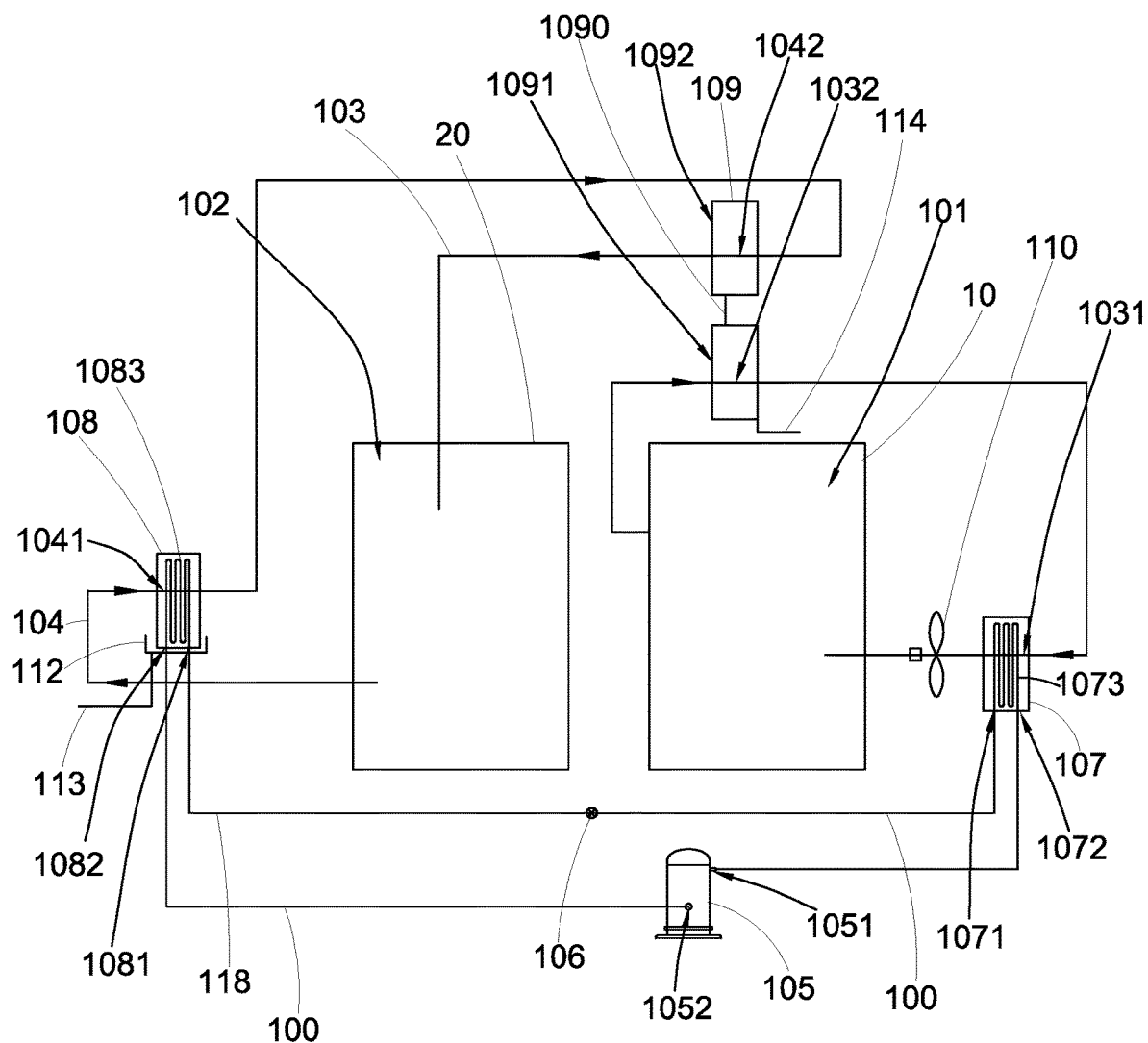
FIG. 4 is a schematic diagram of the heat pump drying system according to a third alternative mode of the first preferred embodiment of the present invention.

Referring to FIG. 4 of the drawings, a third alternative mode of the heat pump drying system according to the first preferred embodiment of the present invention is illustrated. The third alternative mode is identical to what was described in the second alternative mode of the first preferred embodiment above, except the third heat exchanger 109 may comprise a first sub-heat exchanger 1091, a second sub-heat exchanger 1092 and a connecting pipe 1090 connecting the first sub-heat exchanger 1091 and the second sub-heat exchanger 1092. The second sub-heat exchanger 1092 may be positioned above the first sub-heat exchanger 1091. The second heat exchanging portion 1032 of the first air conduit 103 may be arranged to pass through the first sub-heat exchanger 1091. The second heat transfer portion 1042 of the second air conduit 104 may be arranged to pass through the second sub-heat exchanger 1092.

A predetermined amount of refrigerant may be allowed to circulate between the first sub-heat exchanger 1091 and the second sub-heat exchanger 1092 through the connector pipe 1090. The heat exchange between the first air conduit 103 and the second air conduit 104 may be accomplished through the refrigerant. Specifically, the refrigerant may absorb heat from the first air conduit 103 (from the second heat exchanging portion 1032) and release the heat to the second air conduit 104 (to the second heat transfer portion 1042) so that the heat from the air flowing in the first air conduit 103 may be transferred to the air flowing in the second air conduit 104 in the third heat exchanger 109.

In this third alternative mode of the first preferred embodiment of the present invention, the refrigerant having absorbed the heat from the second heat exchanging portion 1032 may become vaporous state which may naturally go up the first sub-heat exchanger 1091 and reach the second sub-heat exchanger 1092 through the connector pipe 1090. The refrigerant in the second sub-heat exchanger 1092 may release heat to the second heat transfer portion 1042 of the second air conduit 104. After releasing heat, the refrigerant may be condensed back to liquid state and naturally drop back down to the first sub-heat exchanger 1091 through the connector pipe 1090 for absorbing heat again. Again, no additional energy is needed to drive the movement of the refrigerant between the first sub-heat exchanger 1091 and the second sub-heat exchanger 1092.

Figure 5:
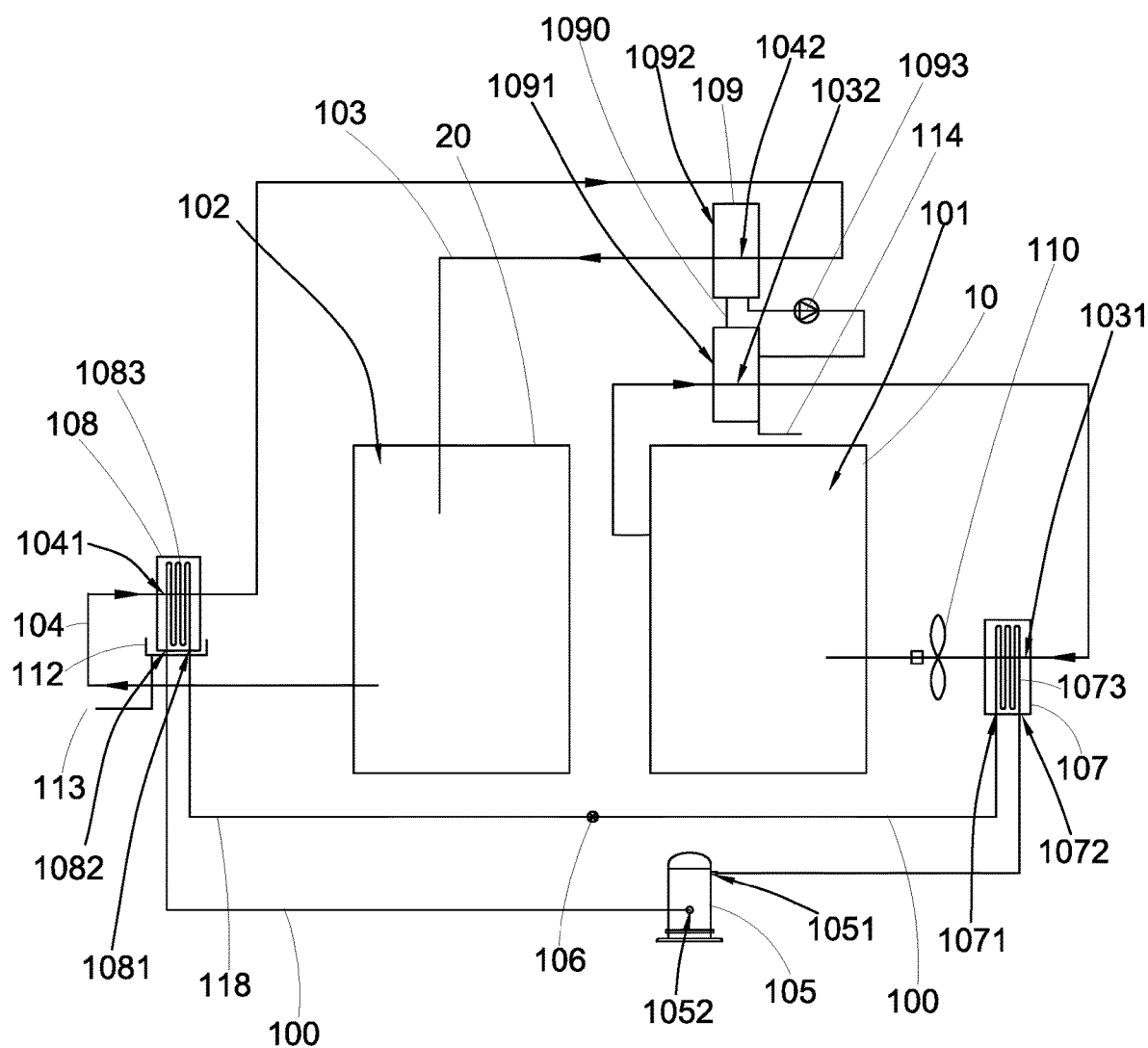
FIG. 5 is a schematic diagram of the heat pump drying system according to a fourth alternative mode of the first preferred embodiment of the present invention.

Referring to FIG. 5 of the drawings, a fourth alternative mode of the heat pump drying system according to the first preferred embodiment of the present invention is illustrated. The fourth alternative mode is identical to what was described in the third alternative mode above (FIG. 4), except that the third heat exchanger 109 may further comprise a pumping device 1093 connecting between the first sub-heat exchanger 1091 and the second sub-heat exchanger 1092 through at least one connecting pipe 100. The pumping device 1093 may be arranged to drive circulation of the refrigerant flowing between the first sub-heat exchanger 1091 and the second sub-heat exchanger 1092. Thus, instead of letting refrigerant to freely circulate between the first sub-heat exchanger 1091 and the second sub-heat exchanger 1092 due to heat exchange, the pumping device 1093 may assist in driving the flow of the refrigerant between the first sub-heat exchanger 1091 and the second sub-heat exchanger 1092 for performing heat exchange with the air flowing in the first air conduit 103 and the second air conduit 104 in the manner described in the third alternative mode above.

Figure 6:
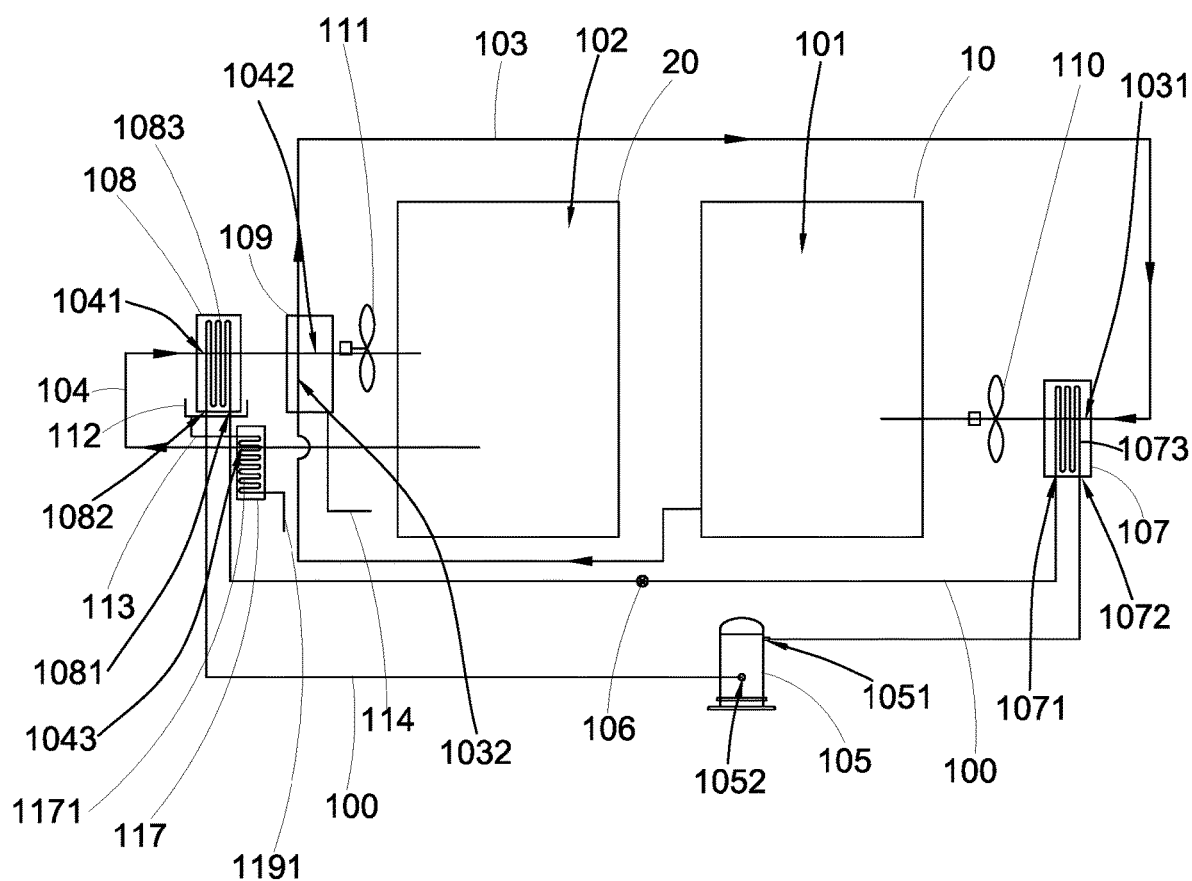
FIG. 6 is a schematic diagram of the heat pump drying system according to a fifth alternative mode of the first preferred embodiment of the present invention.

Referring to FIG. 6 of the drawings, a fifth alternative mode of the heat pump drying system according to the first preferred embodiment of the present invention is illustrated. The fifth alternative mode is identical to what was described in the first preferred embodiment above, except the heat pump drying system may further comprise a fourth heat exchanger 117 connected to the second air conduit 104 at a position between the second drying compartment 102 and the second heat exchanger 108. Thus, air flowing from the second drying compartment 102 may pass through the fourth heat exchanger 117 before flowing into the second heat exchanger 108 and the third heat exchanger 109.

According to the fifth alternative mode of the present invention, the fourth heat exchanger 117 may be arranged to allow the air flowing through the second air conduit 104 in the fourth heat exchanger 117 to perform heat exchange with an external heat exchange medium, such as water or air having a temperature lower than that of the air flowing through the second air conduit 104 in the fourth heat exchanger 117. In other words, the fourth heat exchanger 117 may pre-cool the air flowing in the second air conduit 104 before the air is guided to flow into the second heat exchanger 108.

Thus, the air coming from the second drying compartment 102 in the second air conduit 104 may be guided to sequentially flow through the fourth heat exchanger 117 for releasing a predetermined amount of heat to an external heat exchange medium, the second heat exchanger 108 for releasing a predetermined amount of heat to the refrigerant flowing therethrough, the third heat exchanger 109 for absorbing a predetermined amount of heat from the air flowing in the first air conduit 103 in the third heat exchanger 109, and back to the second drying compartment 102 to complete another drying function.

It is worth mentioning that the fourth heat exchanger 117 may be connected to an external cooling tower for allowing the external heat exchange medium to extract heat from the air flowing in the second air conduit 104 in the fourth heat exchanger 117. Thus, the second air conduit 104 may further have a third heat transfer portion 1043 extending in the fourth heat exchanger 117. The air flowing through the third heat transfer portion 1043 may be arranged to perform heat exchange with the external heat exchange medium, such as water or air.

The purpose of the fourth heat exchanger 117 may be to pre-cool the air flowing through the second air conduit 104 before the air is guided to flow into the second heat exchanger 108. As a result, the temperature of the air flowing into the second heat exchanger 108 (i.e. the temperature of the air flowing in the first heat transfer portion 1041) may become lower when compared to that disclosed in the first preferred embodiment above. The result is to increase the heat exchange efficiency between the air flowing in the first heat transfer portion 1041 and the refrigerant flowing in the second heat exchanging pipes 1083 in the second heat exchanger 108 because of the increase in the temperature difference between the air flowing in the first heat transfer portion 1041 and the refrigerant flowing in the second heat exchanging pipes 1083.

Furthermore, the water discharge tube 113 of the water discharge arrangement 30 may be connected to the fourth heat exchanger 117 so that the condensate or residual water collected in the water collection tray 112 may be guided to flow to the fourth heat exchanger 117 so that the condensate or residual water may act as a heat exchange medium for extracting heat from the air flowing in the third heat transfer portion 1043.

Thus, the water discharge tube 113 may extend through the fourth heat exchanger 117 for performing heat exchange with the third heat transfer portion 1043 of the second air conduit 104. Alternatively, the fourth heat exchanger 117 may comprise a plurality of (but at least one) fourth heat exchanging pipes 1171 connecting to the water discharge tube 113 so that the residual or condensate water may be allowed to feed into the fourth heat exchanger 117 to perform heat exchange with the air flowing in the third heat transfer portion 1043. In this scenario, the heat pump drying system may further comprise a water drainage tube 1191 extended from the fourth heat exchanger 117 for draining residual or condensate water out of the heat pump drying system. The water drainage tube 1191 may be connected to the fourth heat exchanging pipes 1171.

Figure 7:
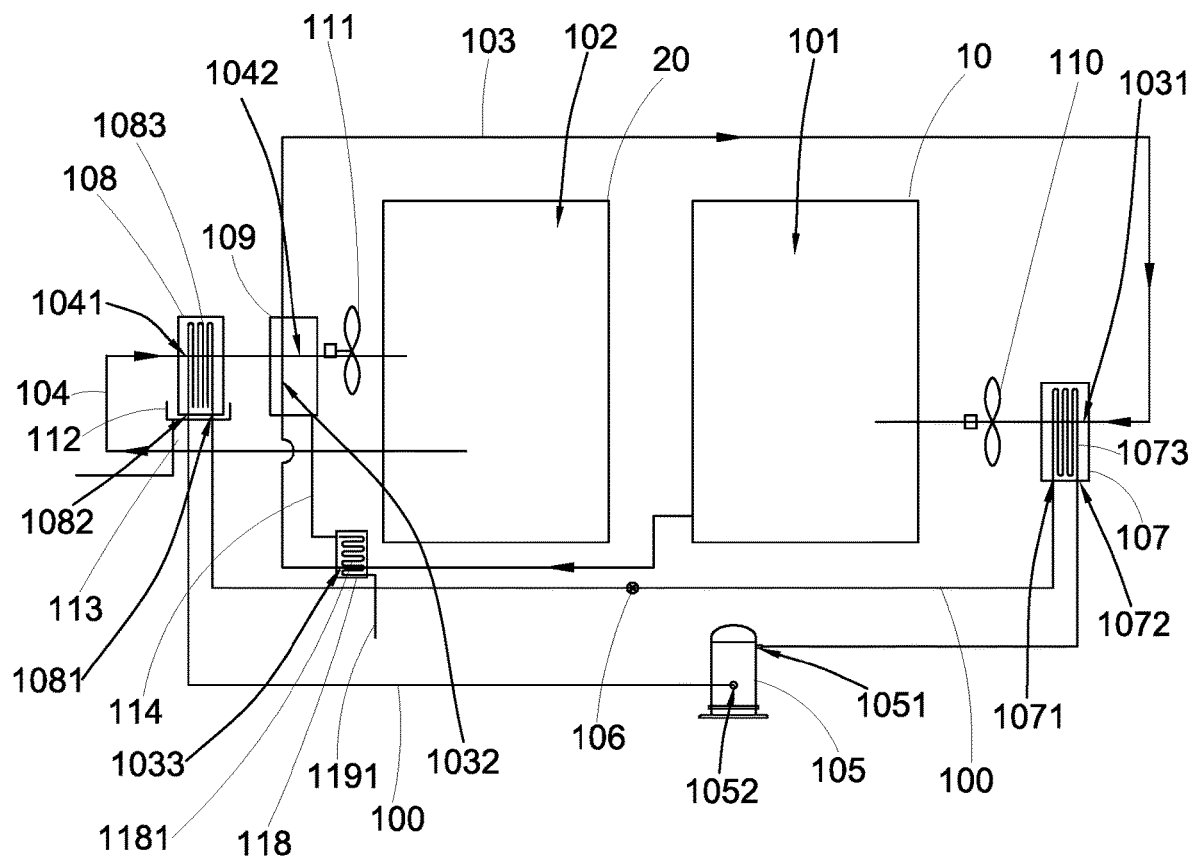
FIG. 7 is a schematic diagram of the heat pump drying system according to a sixth alternative mode of the first preferred embodiment of the present invention.

Referring to FIG. 7 of the drawings, a sixth alternative mode of the heat pump drying system according to the first preferred embodiment of the present invention is illustrated. The sixth alternative mode is identical to what was described in the fifth alternative mode as shown in FIG. 6 of the drawings, except the fourth heat exchanger 118 may now be connected to the first air conduit 103 at a position between the first drying compartment 101 and the third heat exchanger 109. Thus, air flowing from the first drying compartment 101 may pass through the fourth heat exchanger 118 before flowing into the third heat exchanger 109.

It is worth mentioning that the fourth heat exchanger 118 may be arranged to pre-cool the air flowing in the first air conduit 103 before it enters the third heat exchanger 109. The air may then go on to enter the third heat exchanger 109 to release more heat to the air flowing in the second air conduit 104 in the third heat exchanger 109. Thus, in this sixth alternative mode, the first air conduit 103 may pass through the fourth heat exchanger 118 for performing heat exchange with another heat exchange medium.

The water guiding tube 114 may extend from the third heat exchanger 109 to the fourth heat exchanger 118 so that the residual or condensate water formed on the third heat exchanger 109 may be guided to enter the fourth heat exchanger 118 to lower the temperature of the air passing in the first air conduit 103 in the fourth heat exchanger 118 as the "another heat exchange medium" mentioned in the previous paragraph. Note that the water guiding tube 114 may extend into the fourth heat exchanger 118 so as to perform heat exchange with the air flowing in the first air conduit 103.

Alternatively, the fourth heat exchanger 118 may comprise a plurality of (but at least one) fourth heat exchanging pipes 1181 connecting to the water guiding tube 114 so that the residual or condensate water may be allowed to feed into the fourth heat exchanger 118 to perform heat exchange with the air flowing in the first air conduit 103 in the fourth heat exchanger 118. Thus, the first air conduit 103 may further have a third heat exchanging portion 1033 extending in the fourth heat exchanger 118 so that air flowing in the third heat exchanging portion 1033 may be arranged to perform heat exchange with the water coming from the third heat exchanger 109. In this scenario, the heat pump drying system may further comprise a water drainage tube 1191 extended from the fourth heat exchanger 118 for draining residual or condensate water out of the heat pump drying system. The water drainage tube 1191 may be connected to the fourth heat exchanging pipes 1181. Alternatively, the water guiding tube 114 may extend through the fourth heat exchanger 118 and out of the heat pump drying system. In this case, the water drainage tube 1191 may not be necessary. The third heat exchanging portion 1033 may be formed by channels formed in the fourth heat exchanger 118.

Thus, the air coming from the first drying compartment 101 in the first air conduit 103 may be guided to sequentially flow through the fourth heat exchanger 118 for releasing a predetermined amount of heat to an external heat exchange medium (such as the condensate water from the third heat exchanger 109), the third heat exchanger 109 for releasing heat to the air flowing through the second air conduit 104 in the third heat exchanger 109 (i.e. the second heat transfer portion 1042), and the first heat exchanger 107 for absorbing a predetermined amount of heat from the refrigerant flowing therethrough, and back to the first drying compartment 101 to complete another drying function.

One skilled in the art may also appreciate that the fourth heat exchanger 118 may also be connected to an external cooling tower so that the air flowing in the third heat exchanging portion 1033 may perform heat exchange with other external heat exchange mediums, such as cooling water or ambient air.

Figure 8:
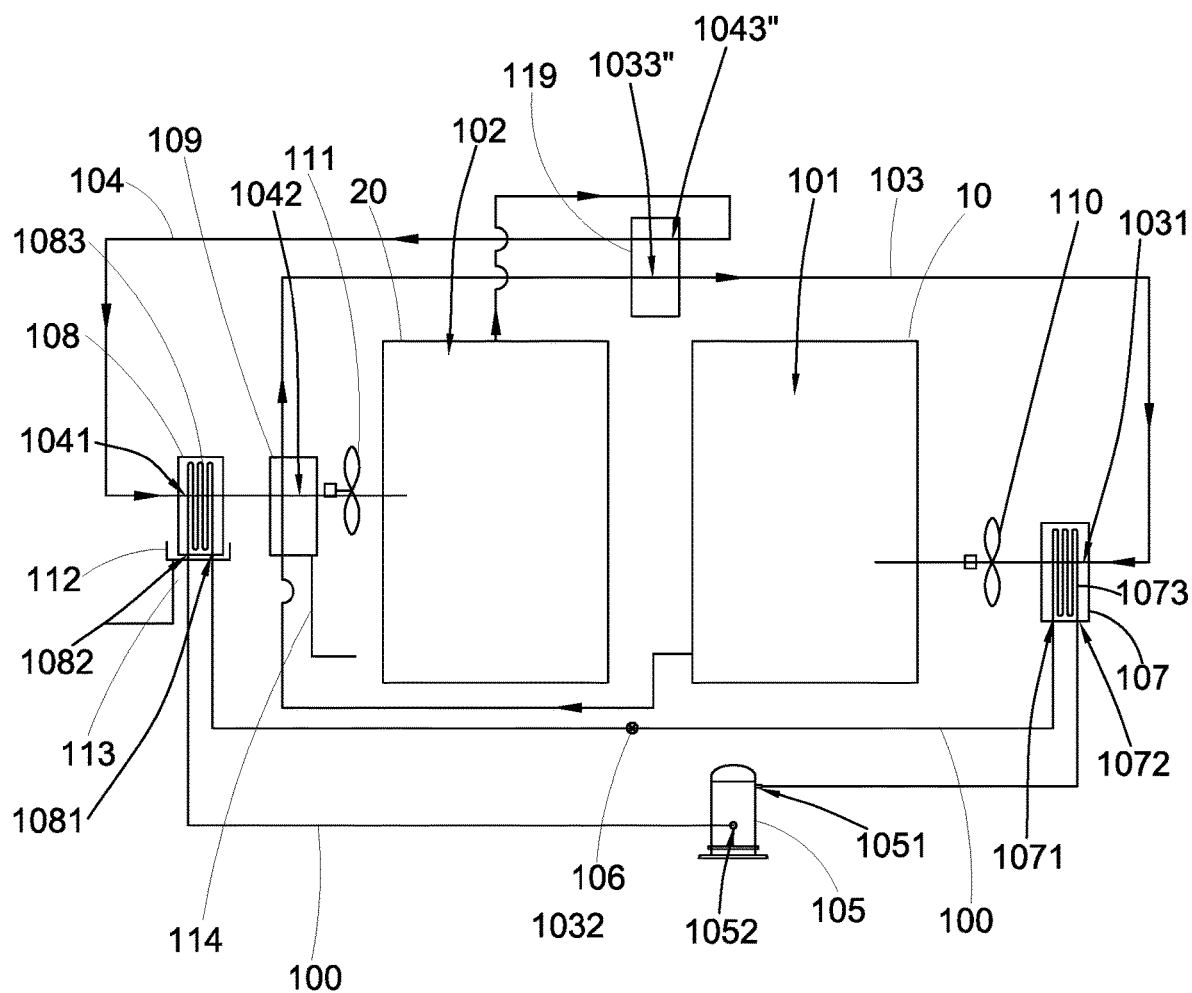
FIG. 8 is a schematic diagram of the heat pump drying system according to a seventh alternative mode of the first preferred embodiment of the present invention.

Referring to FIG. 8 of the drawings, a seventh alternative mode of the heat pump drying system according to the first preferred embodiment of the present invention is illustrated. The seventh alternative mode is similar to the sixth alternative mode described above. Specifically, the heat pump drying system in the seventh alternative mode comprise a first heat exchanger 107, a second heat exchanger 108, a third heat exchanger 109 and a fourth heat exchanger 119.

Specifically, the structure of the first heat exchanger 107, the second heat exchanger 108 and the third heat exchanger 109 are identical to what was disclosed in the first preferred embodiment. The fourth heat exchanger 119 may be connected to the first air conduit 103 between the first heat exchanger 107 and the third heat exchanger 109. Furthermore, the fourth heat exchanger 119 may also be connected to the second air conduit 104 and to the second heat exchanger 108 and the second drying compartment 102.

The fourth heat exchanger 119 may be arranged to allow heat exchange between the air flowing in the first air conduit 103 with the air flowing in the second air conduit 104. Air from the first drying compartment 101 may sequentially pass through, via the first air conduit 103, the third heat exchanger 109 for releasing heat to the air flowing in the second air conduit 104 in the third heat exchanger 109, the fourth heat exchanger 119 for absorbing heat from the air passing through the second air conduit 104 in the fourth heat exchanger 119, the first heat exchanger 107 for further absorbing heat from the refrigerant passing through the first heat exchanger 107, and eventually flow back to the first drying compartment 101 for drying the objects therein.

On the other hand, air from the second drying compartment 102 may sequentially pass through, via the second air conduit 104, the fourth heat exchanger 119 for releasing heat to the air flowing in the first air conduit 103 in the fourth heat exchanger 119, the second heat exchanger 108 for further releasing heat to the refrigerant flowing through the second heat exchanger 108, the third heat exchanger 109 for absorbing heat from the air flowing in the first air conduit 103 in the third heat exchanger 109, and eventually flow back to the second drying compartment 102 for drying the objects therein.

Thus, the first air conduit 103 may further have a third heat exchanging portion 1033" extending in the fourth heat exchanger 119 while the second air conduit 104 may further have a third heat transfer portion 1043" extending in the fourth heat exchanger 119 so that air flowing in the third heat exchanging portion 1033" may be arranged to perform heat exchange with the air flowing in the third heat transfer portion 1043". The third heat exchanging portion 1033" may be formed by channels formed in the fourth heat exchanger 119. The third heat transfer portion 1043" may be formed by channels formed in the fourth heat exchanger 119.

It is worth mentioning that the purpose of the fourth heat exchanger 119 may be to allow the heat pump drying system of the present invention to operate more efficiently. The air flowing in the first air conduit 103 and through the third heat exchanger 109 may be cooled down to a temperature which is lower than a temperature of the air coming out from the second drying compartment 102. As a result, the air flowing in the first air conduit 103 may absorb heat from the air flowing in the second air conduit 104 in the fourth heat exchanger 119. The air in the first air conduit 103 may then flow through the first heat exchanger 107 for being further heated by the refrigerant.

On the other hand, the air in the second air conduit 104 may go on to reach the second heat exchanger 108 for being further cooled down by the refrigerant. Thus, the extent to which the air in the second air conduit 104 is cooled may be greater than the overall work done provided to cool the air in the second air conduit 104 (i.e. the work done by the compressor 105 and the first fan 110 and the second fan 111).

Figure 9:
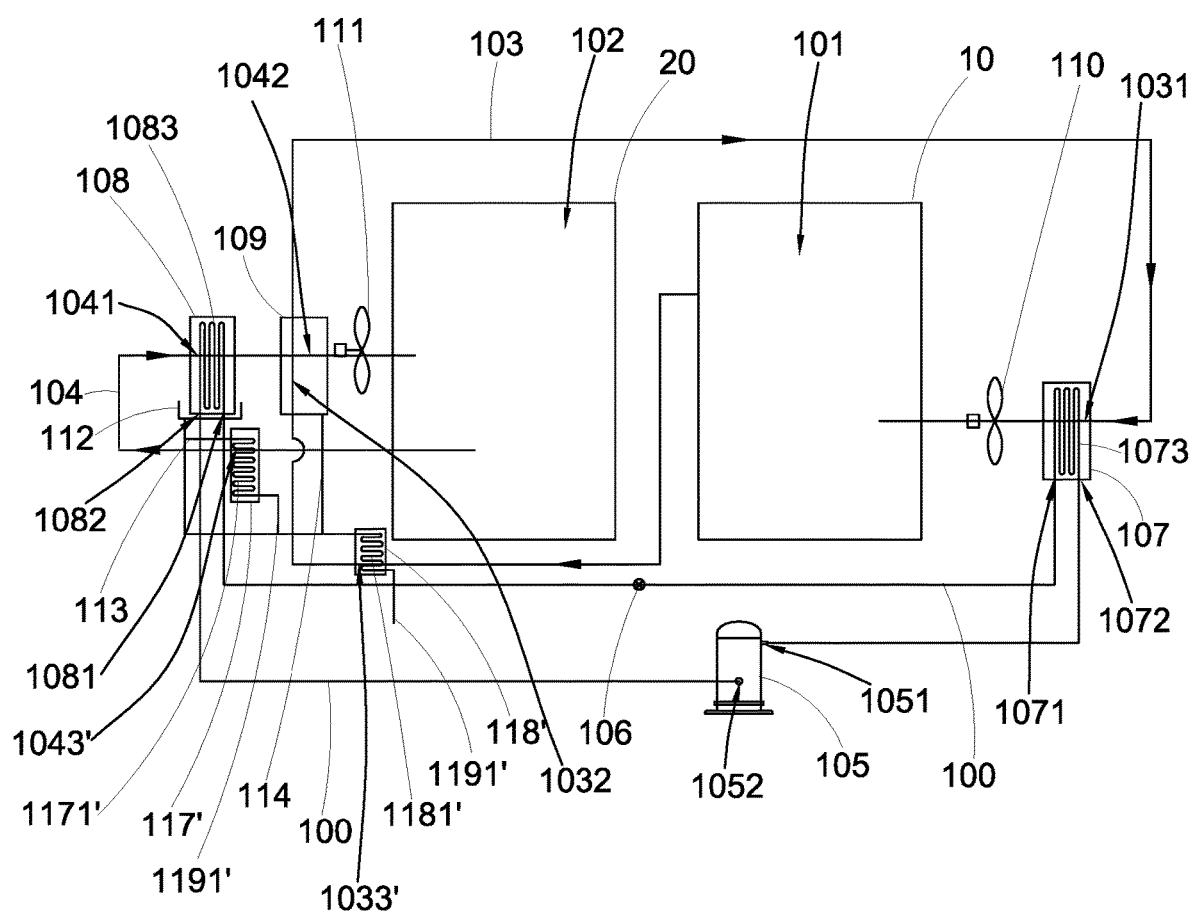
FIG. 9 is a schematic diagram of the heat pump drying system according to an eighth alternative mode of the first preferred embodiment of the present invention.

Referring to FIG. 9 of the drawings, an eighth alternative mode of the heat pump drying system according to the first preferred embodiment of the present invention is illustrated. The eighth alternative mode is essentially a combination of the fifth alternative mode and the sixth alternative mode described above. Thus, the heat pump drying system in this eighth alternative mode may be identical to the first preferred embodiment described above, and may further comprise a fourth heat exchanger 117' connected to the second air conduit 104 at a position between the second drying compartment 102 and the second heat exchanger 108, wherein air flowing from the second drying compartment 102 may pass through the fourth heat exchanger 117' before flowing into the second heat exchanger 108.

The fourth heat exchanger 117' may be arranged to allow the air flowing through the second air conduit 104 in the fourth heat exchanger 117' to perform heat exchange with an external heat exchange medium, such as water or air having a temperature lower than that of the air flowing through the second air conduit 104 in the fourth heat exchanger 117'. The fourth heat exchanger 117' may pre-cool the air flowing in the second air conduit 104 before the air is guided to flow into the second heat exchanger 108.

The air coming from the second drying compartment 102 in the second air conduit 104 may be guided to sequentially flow through the fourth heat exchanger 117' for releasing a predetermined amount of heat to an external heat exchange medium, the second heat exchanger 108 for releasing a predetermined amount of heat to the refrigerant flowing therethrough, the third heat exchanger 109 for absorbing a predetermined amount of heat from the air flowing in the first air conduit 103 in the third heat exchanger 109, and back to the second drying compartment 102 to complete another drying function.

Again, the fourth heat exchanger 117' may be connected to an external cooling tower for allowing the external heat exchange medium to extract heat from the air flowing in the second air conduit 104 in the fourth heat exchanger 117'. Thus, the second air conduit 104 may further have a third heat transfer portion 1043' extending in the fourth heat exchanger 117'. The air flowing through the third heat transfer portion 1043' may be arranged to perform heat exchange with the external heat exchange medium, such as water or air.

The purpose of the fourth heat exchanger 117' may be to pre-cool the air flowing the second air conduit 104 before the air is guided to flow into the second heat exchanger 108. The water discharge tube 113 of the water discharge arrangement 30 may be connected to the fourth heat exchanger 117' so that condensate or residual water collected in the water collection tray 112 may be guided to flow to the fourth heat exchanger 117' so that the condensate or residual water may act as a heat exchange medium for extracting heat from the air flowing in the third heat transfer portion 1043'.

Thus, the water discharge tube 113 may extend through the fourth heat exchanger 117' for performing heat exchange with the third heat transfer portion 1043' of the second air conduit 104.

Alternatively, the fourth heat exchanger 117' may comprise a plurality of (but at least one) fourth heat exchanging pipes 1171' connecting to the water discharge tube 113 so that the residual or condensate water may be allowed to feed into the fourth heat exchanger 117' to perform heat exchange with the air flowing in the third heat transfer portion 1043'. In this scenario, the heat pump drying system may further comprise a water drainage tube 1191' extended from the fourth heat exchanger 117' for draining residual or condensate water out of the heat pump drying system. The water drainage tube 1191' may be connected to the fourth heat exchanging pipes 1171'.

The heat pump drying system may further comprise a fifth heat exchanger 118' connected to the first air conduit 103 at a position between the first drying compartment 101 and the third heat exchanger 109. Air flowing from the first drying compartment 101 may pass through the fifth heat exchanger 118' before flowing into the third heat exchanger 109.

The fifth heat exchanger 118' may be arranged to pre-cool the air flowing in the first air conduit 103 before it enters the third heat exchanger 109. The air may then go on to enter the third heat exchanger 109 to release more heat to the air flowing in the second air conduit 104 in the third heat exchanger 109. Thus, in this eighth alternative mode, the first air conduit 103 may pass through the fifth heat exchanger 118' for performing heat exchange with another heat exchange medium.

The water guiding tube 114 may extend from the third heat exchanger 109 to the fifth heat exchanger 118' so that the residual or condensate water formed on the third heat exchanger 109 may be guided to enter the fifth heat exchanger 118' to lower the temperature of the air passing in the first air conduit 103 in the fifth heat exchanger 118'. Moreover, the water discharge tube 113 may also have a branch extending from the second heat exchanger 108 to the fifth heat exchanger 118' (in addition to going to the fourth heat exchanger 117'). In other words, the condensate water from both the second heat exchanger 108 and the third heat exchanger 109 may be guided to enter the fifth heat exchanger 118' to lower the temperature of the air passing in the first air conduit 103 in the fifth heat exchanger 118' as the "another heat exchange medium" mentioned in the previous paragraph. Furthermore, the water guiding tube 114 and the water discharge tube 113 may merge with each other before entering the fifth heat exchanger 118'.

The fifth heat exchanger 118' may comprise a plurality of (but at least one) fifth heat exchanging pipes 1181' connecting to the water guiding tube 114 and the water discharge tube 113 so that the residual or condensate water from the second heat exchanger 108 and the third heat exchanger 109 may be allowed to feed into the fifth heat exchanger 118' to perform heat exchange with the air flowing in the first air conduit 103 in the fifth heat exchanger 118'. Thus, the first air conduit 103 may further have a third heat exchanging portion 1033' extending in the fifth heat exchanger 118' so that air flowing in the third heat exchanging portion 1033' may be arranged to perform heat exchange with the water coming from the second heat exchanger 108 and the third heat exchanger 109.

The heat pump drying system may further comprise a water drainage tube 1191' extended from the fifth heat exchanger 118' for draining residual or condensate water out of the heat pump drying system. One skilled in the art may also appreciate that the fifth heat exchanger 118' may also be connected to an external cooling tower so that the air flowing in the third heat exchanging portion 1033' may perform heat exchange with other external heat exchange mediums, such as cooling water or ambient air.

Figure 10:
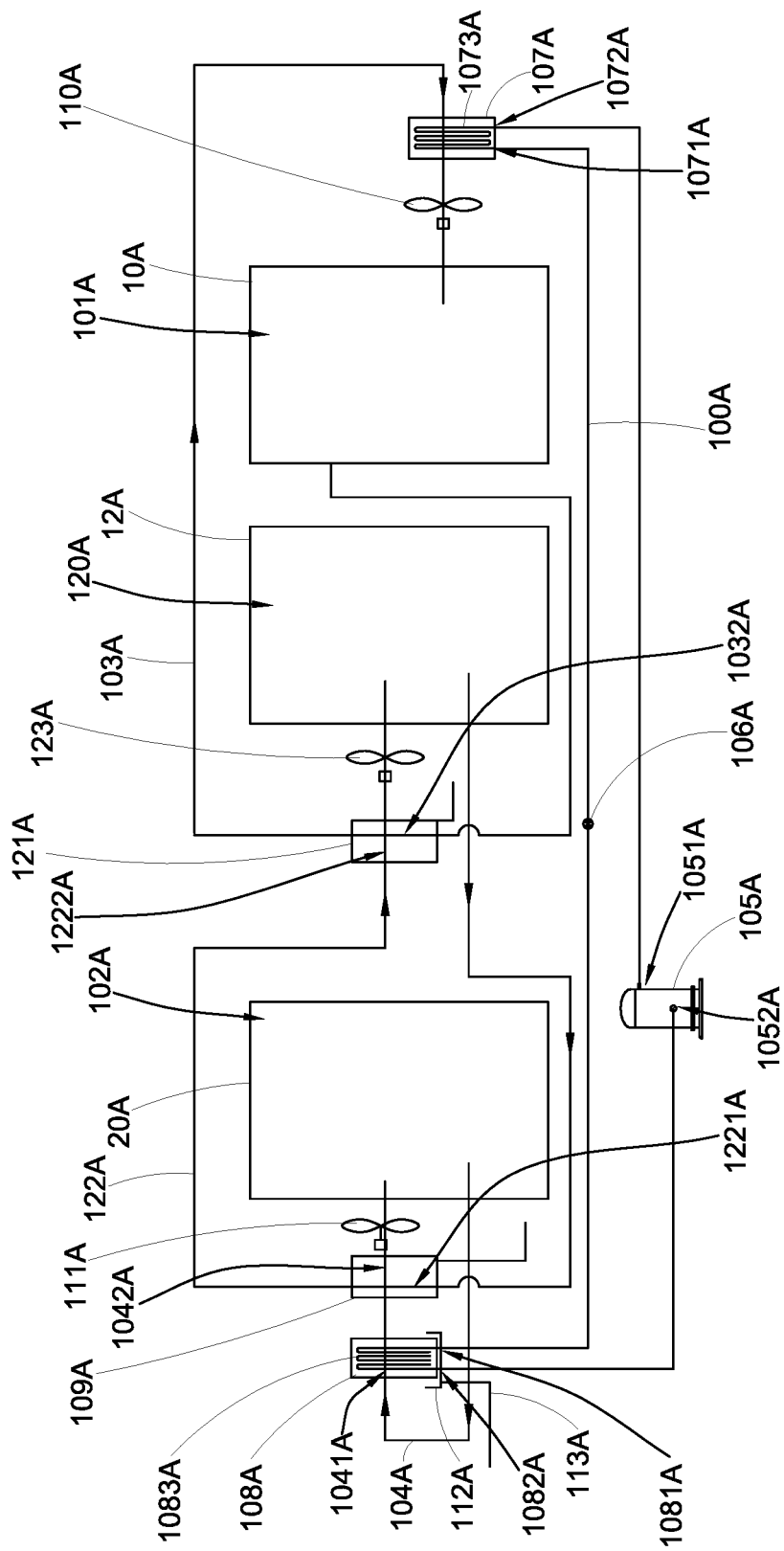
FIG. 10 is a schematic diagram of a heat pump drying system according to a second preferred embodiment of the present invention.

Referring to FIG. 10 of the drawings, a heat pump drying system according to a second preferred embodiment of the present disclosure is illustrated. Broadly, the heat pump drying system may comprise a plurality of connecting pipes 100A for allowing heat exchange medium to pass therethrough, a first drying housing 10A having a first drying compartment 101A, a second drying housing 20A having a second drying compartment 102A, a third drying housing 12A having a third drying compartment 120A a compressor 105A having a compressor outlet 1051A and a compressor inlet 1052A, a first heat exchanger 107A, a second heat exchanger 108A, a third heat exchanger 109A, a fourth heat exchanger 121A, a first air conduit 103A, a second air conduit 104A, a third air conduit 122A, a first fan 110, a second fan 111 and a third fan 123A.

The first drying compartment 101A, the second drying compartment 102A and the third drying compartment 120A may be positioned in a side-by-side manner. In this second preferred embodiment, third drying compartment 120A may be positioned between the first drying compartment 101A and the second drying compartment 102A.

The first heat exchanger 107A may be connected to the compressor outlet 1051A of the compressor 105A through at least one of the connecting pipes 100A. The second heat exchanger 108A may be connected to the compressor inlet 1052A of the compressor 105A through at least one of the connecting pipes 100A. The fourth heat exchanger 121A may be connected to the first air conduit 103A and the third air conduit 122A.

The first air conduit 103A may communicate with the first drying compartment 101A, and partially pass through the fourth heat exchanger 121A and the first heat exchanger 107A.

The second air conduit 104A may communicate with the second drying compartment 102A, and partially pass through the second heat exchanger 108A and the third heat exchanger 109A.

The third heat exchanger 109A may be connected to the third air conduit 122A and the second air conduit 104A for allowing air flowing through the third air conduit 122A and the second air conduit 104A to perform heat exchange. The third heat exchanger 109A may be positioned between the second drying compartment 102A and the second heat exchanger 108A.

The first fan 110A may be supported in communication with the first air conduit 103A so as to draw air to flow in the first air conduit 103A from the first drying compartment 101A to sequentially pass through the fourth heat exchanger 121A and the first heat exchanger 107A and back to the first drying compartment 101A.

The second fan 111A may be supported in communication with the second air conduit 104A so as to draw air to flow in the second air conduit 104A from the second drying compartment 102A to sequentially pass through the second heat exchanger 108A and the third heat exchanger 109A and back to the second drying compartment 102A.

The third fan 123A may be supported in communication with the third air conduit 122A so as to draw air to flow in the third air conduit 122A from the third drying compartment 120A to sequentially pass through the third heat exchanger 109A and the fourth heat exchanger 121A and back to the third drying compartment 120A.

At the same time, a predetermined amount of refrigerant may be arranged to leave the compressor 105A through the compressor outlet 1051A and pass through the first heat exchanger 107A for releasing heat to the air passing therethrough. The refrigerant leaving the first heat exchanger 107A may be arranged to pass through the second heat exchanger 108A for absorbing heat from the air passing therethrough. The refrigerant leaving the second heat exchanger 108A may be arranged to flow back to the compressor 105A through the compressor inlet 1052A.

Moreover, a predetermined amount of air may be arranged to flow through from the first drying compartment 101A and enter the first air conduit 103A and sequentially pass through the fourth heat exchanger 121A for releasing heat to the air flowing through the third air conduit 122A in the fourth heat exchanger 121A. The air in the first air conduit 103A and flowing through the fourth heat exchanger 121A may be arranged to flow through the first heat exchanger 107A for absorbing heat from the refrigerant flowing therethrough. The air in the first air conduit 103A and flowing through the first heat exchanger 107A may be arranged to flow back to the first drying compartment 101A.

A predetermined amount of air may be arranged to flow from the second drying compartment 102A and enter the second air conduit 104A and sequentially pass through the second heat exchanger 108A for releasing heat to the refrigerant passing therethrough. The air in the second air conduit 104A and passing through the second heat exchanger 108A may be arranged to flow through the third heat exchanger 109A for absorbing heat from the air flowing through the third air conduit 122A in the third heat exchanger 109A. The air in the second air conduit 104A and flowing through the third heat exchanger 109A may be arranged to flow back to the second drying compartment 102A.

A predetermined amount of air may be arranged to flow from the third drying compartment 120A and enter the third air conduit 122A and sequentially pass through the third heat exchanger 109A for releasing heat to the air passing in the second air conduit 104A. The air in the third air conduit 122A and passing through the third heat exchanger 109A may be arranged to flow through the fourth heat exchanger 121A for absorbing heat from the air flowing through the first air conduit 103A in the fourth heat exchanger 121A. The air in the third air conduit 122A and flowing through the fourth heat exchanger 121A may be arranged to flow back to the third drying compartment 120A.

According to the second preferred embodiment of the present invention, the heat pump drying system is for drying a wide variety of objects, such as agricultural products, herbal products, or even soils. These objects may be disposed in the first drying compartment 101A, the second drying compartment 102A and the third drying compartment 120A. A predetermined amount of refrigerant may flow through the connecting pipes 100A for performing heat exchange with another medium, such as air.

The first heat exchanger 107A may have a first communicating port 1071A and a second communicating port 1072A and a plurality of first heat exchanging pipes 1073A extended between the first communicating port 1071A and the second communicating port 1072A. Refrigerant may enter and exit the first heat exchanger 107A through the first communicating port 1071A and the second communicating port 1072A for performing heat exchange with another heat exchange medium. As shown in FIG. 10 of the drawings, the first communicating port 1071A may be connected to the compressor outlet 1051A of the compressor 105A through at least one connecting pipe 100A.

Similarly, the second heat exchanger 108A may have a first passage port 1081A and a second passage port 1082A and a plurality of second heat exchanging pipes 1083A extended between the first passage port 1081A and the second passage port 1082A. Refrigerant may enter and exit the second heat exchanger 108A through the first passage port 1081A and the second passage port 1082A for performing heat exchange with another heat exchange medium.

The heat pump drying system may further comprise a flow regulator 106A connected between the first heat exchanger 107A and the second heat exchanger 108A for regulating a flow of refrigerant between the first heat exchanger 107A and the second heat exchanger 108A. Specifically, the flow regulator 106A may be connected between the second communicating port 1072A of the first heat exchanger 107A and the first passage port 1081A of the second heat exchanger 108A through at least one connecting pipes 100A so that refrigerant may flow from the second communicating port 1072A to the first passage port 1081A through the flow regulator 106A.

Moreover, the second passage port 1082A of the second heat exchanger 108A may be connected to the compressor inlet 1052A of the compressor 105A through at least one of the connecting pipes 100A.

It is worth clarifying the nature of the first air conduit 103A, the second air conduit 104A and the third air conduit 122A. Each of the first air conduit 103A, the second air conduit 104A and the third air conduit 122A may be formed by an air duct extending through the corresponding path as mentioned above.

The third heat exchanger 109A may accommodate a section of the third air conduit 122A and a section of the second air conduit 104A so as to allow heat exchange between the third air conduit 122A and the second air conduit 104A. Specifically, the third air conduit 122A may have a first heat conducting portion 1221A while the second air conduit 104A may have a second heat transfer portion 1042A, wherein the first heat conducting portion 1221A and the second heat transfer portion 1042A may extend in the third heat exchanger 109A for allowing air passing through the first heat conducting portion 1221A and the second heat transfer portion 1042A to perform heat exchange with each other. The second heat transfer portion 1042A may be formed by channels formed in the third heat exchanger 109A. The first heat conducting portion 1221A may be formed by channels formed in the third heat exchanger 109A.

As shown in FIG. 10 of the drawings, the first air conduit 103A may extend from the first drying compartment 101A, and pass through the fourth heat exchanger 121A, the first heat exchanger 107A and eventually go back to the first drying compartment 101A. The first air conduit 103A may allow air to flow therethrough. The first fan 110A may be provided to draw air to flow through the first air conduit 103A in the direction mentioned above. Thus, the first air conduit 103A may have a first heat exchanging portion 1031A extending through the first heat exchanger 107A, and a second heat exchanging portion 1032A extending through the fourth heat exchanger 121A. The first heat exchanging portion 1031A and the second heat exchanging portion 1032A may be formed by channels formed in the first heat exchanger 107A and the fourth heat exchanger 121A respectively.

On the other hand, the second air conduit 104A may extend from the second drying compartment 102A, and pass through the second heat exchanger 108A, and the third heat exchanger 109A, and eventually go back to the second drying compartment 102A. The second air conduit 104A may allow air to flow therethrough. The second fan 111A may be provided to draw air to flow through the second air conduit 104A in the direction mentioned above. Thus, the second air conduit 104A may have a first heat transfer portion 1041A extending through the second heat exchanger 108A. The first heat transfer portion 1041A may be formed by channels formed in the second heat exchanger 108A.

The third air conduit 122A may extend from the third drying compartment 120A, and pass through the third heat exchanger 109A, and the fourth heat exchanger 121A, and eventually go back to the third drying compartment 120A. The third air conduit 122A may allow air to flow therethrough. The third fan 123A may be provided to draw air to flow through the third air conduit 122A in the direction mentioned above. Thus, the third air conduit 122A may have a first heat conducting portion 1221A extending through the third heat exchanger 109A, and a second heat conducting portion 1222A extending in the fourth heat exchanger 121A. The second heat conducting portion 1222A may be formed by channels formed in the fourth heat exchanger 121A.

The heat pump drying system may further comprise a water discharge arrangement 30A comprising a water collection tray 112A provided underneath the second heat exchanger 108A for collecting residual or condensate water dripping from the second heat exchanger 108A, and a water discharge tube 113A extended from the water collection tray 112A to an external water discharge place. The external water discharge place may be the ambient environment in which the heat pump drying system is located. The purpose of the water discharge arrangement 30A may be to guide residual or condensate water to be discharge from the heat pump drying system.

A predetermined amount of refrigerant may circulate between the compressor 105A, the first heat exchanger 107, and the second heat exchanger 108A. Specifically, vaporous or heated refrigerant may leave the compressor 105A through the compressor outlet 1051A. The refrigerant leaving the compressor outlet 1051A may be arranged to enter the first heat exchanger 107A through the first communicating port 1071A for releasing heat to the air passing through the first heat exchanging portion 1031A of the first air conduit 103A. The air passing through the first heat exchanging portion 1031A of the first air conduit 103A may absorb heat from the refrigerant and may be guided to enter the first drying compartment 101A for drying the items disposed therein.

Furthermore, the refrigerant leaving the first heat exchanger 107A may be arranged to enter the second heat exchanger 108A through the first passage port 1081A for absorbing heat from the air passing therethrough. The refrigerant may then leave the second heat exchanger 108A through the second passage port 1082A and may then be arranged to flow back to the compressor 105A through the compressor inlet 1052A.

At the same time, air may be drawn from the second drying compartment 102A to pass through the second heat exchanger 108 for releasing heat (e.g. Q amount of heat) to the refrigerant passing through the second heat exchanger 108A. In other words, the air passing through the second heat exchanger 108A may be cooled by the second heat exchanger 108A. During this cooling process, a predetermined amount of condensate or residual water may be formed on an exterior surface of the second heat exchanger 108A. This condensate or residual water may then be collected in the water collection tray 112A and may be discharged through the water discharge tube 113A.

The air passing through the second heat exchanger 108A may then be arranged to pass through the third heat exchanger 109A along the second air conduit 104A and may perform heat exchange with the air flowing along the first air conduit 103A. The air flowing through the second air conduit 104A may absorb heat (e.g. Q amount of heat) from the air flowing through the third air conduit 122A in the third heat exchanger 109A. Conversely, the air flowing through the third air conduit 122A may be cooled down in the third heat exchanger 109A. The air in the second air conduit 104A may then be arranged to flow back to the second drying compartment 102A for drying objects disposed therein.

The air flowing in the third air conduit 122A may continue to flow into the fourth heat exchanger 121A and absorb heat from the refrigerant passing therethrough. The air may then be heated and flow back to the third drying compartment 120A for drying the objects disposed therein.

The air flowing in the first air conduit 103A may flow through the fourth heat exchanger 121A for releasing heat to the air flowing in the third air conduit 122A in the fourth heat exchanger 121A. The air in the first air conduit 103A may then go on to flow through the first heat exchanger 107A for absorbing heat from the refrigerant flowing therethrough and eventually flow back to the first drying compartment 101A for drying the objects disposed therein.

Finally, it is worth mentioning that the channels formed in the various heat exchangers mentioned above may be formed by internal air ducts equipped in the corresponding heat exchanger, or other components which form corresponding through channels in the corresponding heat exchanger. The exact configuration may depend on the manufacturing and operational circumstances of the present invention.

Embodiments of the present disclosure, while illustrated and described in terms of a preferred embodiment and several alternatives, is not limited to the particular description contained in this specification. Additional alternative or equivalent components could also be used to practice embodiments of the present disclosure.

What is claimed is:

1. A heat pump drying system, comprising:
a plurality of connecting pipes for allowing refrigerant to pass therethrough;
a first drying housing defining a first drying compartment;
a second drying housing defining a second drying compartment, said first drying compartment and said second drying compartment being arranged adjacent to each other;
a compressor having a compressor inlet and a compressor outlet;
a first heat exchanger connected to said compressor outlet of said compressor through at least one of the plurality of connecting pipes and positioned out of said first drying compartment and said second drying compartment;
a second heat exchanger connected to said compressor inlet of said compressor through another at least one of the plurality of connecting pipes and positioned out of said first drying compartment and said second drying compartment;
a third heat exchanger positioned out of said first drying compartment and said second drying compartment;
a first air conduit communicating with said first drying compartment, said first air conduit having a first heat exchanging portion extending through said first heat exchanger, and a second heat exchanging portion extending through said third heat exchanger;
a second air conduit communicating with said second drying compartment, said second air conduit having a first heat transfer portion extending through said second heat exchanger, and a second heat transfer portion extending through said third heat exchanger, air passing through said second heat exchanging portion and said second heat transfer portion being arranged to perform heat exchange with each other in said third heat exchanger;
a first fan supported in communication with said first air conduit so as to draw air to flow in said first air conduit through said third heat exchanger and said first heat exchanger;
a second fan supported in communication with said second air conduit so as to draw air to flow in said second air conduit through said second heat exchanger and said third heat exchanger; and
a flow regulator connected between said first heat exchanger and said second heat exchanger for regulating a flow of the refrigerant between said first heat exchanger and said second heat exchanger;
a predetermined amount of the refrigerant being arranged to leave said compressor through said compressor outlet and pass through said first heat exchanger for releasing heat to said air passing therethrough, said refrigerant leaving said first heat exchanger being arranged to pass through said second heat exchanger for absorbing heat from said air passing therethrough, said refrigerant leaving said second heat exchanger being arranged to flow back to said compressor through said compressor inlet,
the air drawn by the first fan flowing through said first air conduit starting from said first drying compartment and sequentially passing through said second heat exchanging portion extending through said third heat exchanger and said first heat exchanging portion extending through said first heat exchanger for absorbing heat from said refrigerant flowing therethrough, said air in said first air conduit having passed through said first heat exchanging portion extending through said first heat exchanger being arranged to flow back to said first drying compartment; and
the air drawn by the second fan flowing through said second air conduit starting from said second drying compartment and sequentially passing through said first heat transfer portion extending through said second heat exchanger for releasing heat to said refrigerant passing therethrough and said second heat transfer portion extending through said third heat exchanger for absorbing heat from said air flowing through said second heat exchanging portion of said first air conduit, said air in said second air conduit having passed through said second heat transfer portion extending through said third heat exchanger being arranged to flow back to said second drying compartment.

2. The heat pump drying system, as recited in claim 1, further comprising a water discharge arrangement comprising a water collection tray provided underneath said second heat exchanger for collecting residual water generated from said second heat exchanger, and a water discharge tube extended from said water collection tray to ambient environment.

3. The heat pump drying system, as recited in claim 2, further comprising a water guiding tube connected to said third heat exchanger for guiding residual water formed on said third heat exchanger to flow out of said heat pump drying system.

\* \* \* \* \*